(12) United States Patent
McGloin et al.

(10) Patent No.: US 7,848,947 B1
(45) Date of Patent: Dec. 7, 2010

(54) PERFORMANCE MANAGEMENT SYSTEM

(75) Inventors: Cathal McGloin, Dublin (IE);
Raymond McGloin, Dublin (IE)

(73) Assignee: IEX Corporation, Richardson, TX (US)

( * ) Notice: Subject to any disclaimer, the term of this patent is extended or adjusted under 35 U.S.C. 154(b) by 450 days.

(21) Appl. No.: 09/672,829

(22) Filed: Sep. 29, 2000

Related U.S. Application Data (63) Continuation-in-part of application No. PCT/IE00/00074, filed on Jun. 8, 2000.

(30) Foreign Application Priority Data

Aug. 3, 1999 (IE) .................................. 990665

(51) Int. Cl.
G06F 11/34 (2006.01)
H04M 3/51 (2006.01)

(52) U.S. Cl. ............................... 705/11; 705/2

(58) Field of Classification Search ............ 705/1, 705/2–4, 5, 7, 9, 11
See application file for complete search history.

(56) References Cited

U.S. PATENT DOCUMENTS 5,206,903 A 4/1993 Kohler et al.

(Continued)

FOREIGN PATENT DOCUMENTS

EP 0740450 A2 10/1996

(Continued)

OTHER PUBLICATIONS

Darling et al., "Databases with character," InfoWorld, Feb. 21, 1994, vol. 16, issue 8, pp. 67-79.*
Duncan, Judy, "Product Comparison: Database Building Blocks," InfoWorld, Nov. 18, 1991, vol. 13, issue 46, pp. 87-109.*

(Continued)

*Primary Examiner*—Gerald J. O'Connor
*Assistant Examiner*—Linh Michelle Le
(74) *Attorney, Agent, or Firm*—Pearl Cohen Zedek Latzer, LLP (57) ABSTRACT

A performance management system (1) has a database (9) with KPI (10), Results & Ratings (11), and configuration date (12) tables. Configuration functions (8) configure the system to the environment and information management functions perform raw data capture and processing. The configuration functions (8) include a data dictionary function for formulation of calculation rules, and an objective wizard function for configuring objectives. Objectives are associated with individual agents by associating appraisal rating groups and data dictionary items with objectives. The objectives are grouped into objective groups, in turn associated with individual agents.

20 Claims, 8 Drawing Sheets

U.S. PATENT DOCUMENTS

| | | | |
|---|---|---|---|
| 5,381,332 A * | 1/1995 | Wood | 705/8 |
| 5,428,738 A * | 6/1995 | Carter et al. | 345/804 |
| 5,450,545 A * | 9/1995 | Martin et al. | 717/109 |
| 5,500,795 A * | 3/1996 | Powers et al. | 705/11 |
| 5,560,005 A * | 9/1996 | Hoover et al. | 707/10 |
| 5,721,912 A * | 2/1998 | Stepczyk et al. | 707/102 |
| 5,806,066 A | 9/1998 | Golshani et al. | |
| 5,815,155 A * | 9/1998 | Wolfston, Jr. | 715/855 |
| 5,909,669 A * | 6/1999 | Havens | 705/11 |
| 5,926,794 A * | 7/1999 | Fethe | 705/11 |
| 5,966,532 A * | 10/1999 | McDonald et al. | 717/105 |
| 5,987,481 A * | 11/1999 | Michelman et al. | 715/219 |
| 6,119,097 A * | 9/2000 | Ibarra | 705/11 |
| 6,157,808 A | 12/2000 | Hollingsworth | 434/350 |
| 6,263,434 B1 * | 7/2001 | Hanna et al. | 713/156 |
| 6,275,812 B1 * | 8/2001 | Haq et al. | 705/11 |
| 6,308,178 B1 * | 10/2001 | Chang et al. | 707/100 |
| 6,396,512 B1 | 5/2002 | Nickerson | |
| 6,546,230 B1 | 4/2003 | Allison | |
| 6,564,368 B1 | 5/2003 | Beckett et al. | |
| 6,571,281 B1 | 5/2003 | Nickerson | |
| 6,604,084 B1 | 8/2003 | Powers et al. | |
| 6,615,182 B1 * | 9/2003 | Powers et al. | 705/7 |
| 6,694,374 B1 | 2/2004 | McGloin et al. | |
| 6,735,570 B1 | 5/2004 | Lacy et al. | |
| 6,741,993 B1 | 5/2004 | Zitaner et al. | |
| 6,754,874 B1 | 6/2004 | Richman | |
| 6,789,047 B1 | 9/2004 | Woodson | |
| 2001/0034628 A1 * | 10/2001 | Eder | 705/7 |
| 2002/0019765 A1 | 2/2002 | Mann et al. | |
| 2002/0024531 A1 | 2/2002 | Herrell, III | |
| 2002/0035506 A1 | 3/2002 | Loya | |
| 2002/0055866 A1 | 5/2002 | Dewar | |
| 2002/0062242 A1 | 5/2002 | Suzuki | |
| 2002/0123925 A1 | 9/2002 | Smith | |
| 2002/0173934 A1 | 11/2002 | Potenza | |
| 2002/0184085 A1 | 12/2002 | Lindia et al. | |
| 2003/0004736 A1 | 1/2003 | Calderaro et al. | |
| 2003/0004790 A1 | 1/2003 | Calderaro et al. | |
| 2003/0009346 A1 | 1/2003 | Shimizu | |
| 2003/0078804 A1 | 4/2003 | Morrel-Samuels | |
| 2003/0101091 A1 | 5/2003 | Levin et al. | |
| 2003/0120537 A1 | 6/2003 | Desanti et al. | |
| 2003/0182173 A1 | 9/2003 | D'Elena et al. | |
| 2003/0191680 A1 | 10/2003 | Dewar | |
| 2003/0195786 A1 | 10/2003 | Dewar | |
| 2003/0200136 A1 | 10/2003 | Dewar | |
| 2003/0204440 A1 | 10/2003 | Koller et al. | |
| 2003/0208752 A1 | 11/2003 | Farris | |
| 2003/0216957 A1 | 11/2003 | Florence et al. | |
| 2004/0060051 A1 | 3/2004 | Bradshaw | |
| 2004/0073479 A1 | 4/2004 | Walsh | |
| 2004/0088177 A1 | 5/2004 | Travis et al. | |
| 2004/0117617 A1 | 6/2004 | Geller et al. | |
| 2004/0128188 A1 | 7/2004 | Leither et al. | |
| 2004/0138944 A1 | 7/2004 | Whiteacre et al. | |
| 2004/0153355 A1 | 8/2004 | Deering et al. | |
| 2004/0158487 A1 | 8/2004 | Miles et al. | |
| 2004/0193494 A1 | 9/2004 | Zitaner et al. | |
| 2004/0204984 A1 | 10/2004 | Yeh et al. | |
| 2004/0215503 A1 | 10/2004 | Allpress et al. | |
| 2004/0215504 A1 | 10/2004 | Ikezawa | |

FOREIGN PATENT DOCUMENTS

| | | |
|---|---|---|
| WO | WO99/60766 | 10/1999 |
| WO | WO99/60766 | 11/1999 |
| WO | WO00/13112 | 3/2000 |

OTHER PUBLICATIONS

Darling et al., "Database with character," InfoWorld, Feb. 21, 1994, vol. 16, issue 8, pp. 67-69.*

Office Action for U.S. Appl. No. 09/672,830 dated Jan. 25, 2007.

Office Action for U.S. Appl. No. 09/672,830 dated Mar. 3, 2003.

Final Office Action for U.S. Appl. No. 09/672,830 dated Nov. 13, 2003.

Office Action for U.S. Appl. No. 09/672,830 dated Jul. 28, 2004.

Final Office Action for U.S. Appl. No. 09/672,830 dated May 19, 2005.

Office Action for U.S. Appl. No. 09/672,830 dated May 22, 2006.

Office Action for U.S. Appl. No. 09/672,830 dated Feb. 3, 2009.

Detbyshire, M.H., "An Architecture for a Business Data Warehouse," The ICL Systems Journal, International Computers Limited, GB, vol. 11, No. 1, May 1, 1996, pp. 23-47, XP000631249 ISSN: 1364-310X.

European Office Action, issued Feb. 25, 2010, for European Patent Application No. 00 931 514.4.

* cited by examiner

| Level | Icon | Description |
|-------|------|-------------|
| 1 | | Agent |
| 2 | | Team Leader |
| 3 | | Manager |
| 4 | | Senior Manager |
| 5 | | Function |
| 6 | | Site Address |
| 7 | | Organisation |

Hierarchy Maintenance

Hierarchy | Product Authorisation

Selection Icon   Add   Remove

OK   Cancel   Help

Fig. 3(a)

| Hierarchy | Product Authorisation | | | | |
|---|---|---|---|---|---|
| Product | Agent | Team Leader | Manager | enior Manag | Function Sit |
| APPRAISAL M | ✓ | ✓ | | ✓ | ✓ |
| PERSONAL DE | ✓ | ✓ | ✓ | ✓ | ✓ |
| MANUAL ENTA | ✓ | ✓ | ✓ | ✓ | ✓ |
| REWARD + REI | ✓ | ✓ | ✓ | ✓ | ✓ |
| KEY PERF INDI | | ✓ | | ✓ | ✓ |
| REPORT MAN | | | | | |

[Clear All] [Select All]

[OK] [Cancel] [Help]

Data Dictionary Configuration

General | Formula | Rules

| Field | Description |
|---|---|
| FGN_VALUE1 | Avg Handling Time |
| FGN_VALUE2 | Talk Time |
| FGN_VALUE3 | Wrap Time |

Value 1: sum[fgn_value5]
Operator: /
Value 2: sum[fgn_value21]

Test Data
Result: [ ]    [Test]

[OK] [Cancel] [Help]

Fig. 4(b)

Data Dictionary Configuration

General | Formula | Rules

Min Value: 0   Max Value: 10000
Display Mask: ##%

☐ KPI Entry
☐ Manual Data Entry
☑ Override

[OK] [Cancel] [Help]

PERFORMANCE MANAGEMENT SYSTEM

This is a PCT Continuation in Part of PCT/IE00/00074, filed Jun. 8, 2000

FIELD OF THE INVENTION

The invention relates to a performance management system for use in a processing environment in which the people resources account for a large proportion of the operational cost and therefore, associated costs and revenues are dependent on the successful management of the performance of this resource in terms of productivity, quality and behavior. A contact centre is only one example, and the invention applies to any business requiring performance management.

PRIOR ART DISCUSSION

Heretofore, much work has been carried out on development of contact center functionality such as switches/ACDs, fax gateway, e-mail, web, Customer Relationship Management, quality and workforce management systems. For example, U.S. Pat. No. 5,206,903 (AT & T) describes automatic call distribution equipment which routes calls according to agent skills. European Patent Specification No. 0740450A2 (IBM) also describes such a system. PCT Patent Specification No. WO99/60766 (Callscan) describes a system to optimize human resource allocation in a call center environment. The system includes a knowledge base, a call activity monitor, and a performance reference model.

All of these developments to date focus on the following categories:

Contact Management
ACD's, Fax Gateways, IVR, E-Mail, Web—to manage and either automatically handle or route customer contacts according to configurable routing criteria.

Workforce Management
Workforce Management Systems—used primarily to forecast anticipated workloads and the scheduling of the corresponding resources required to achieve self-imposed service level goals.

Quality Assessment
Quality Systems—focused on the monitoring and evaluation of the quality of customer contacts.

Customer Relationship Management
"CRM" Systems—focused on consolidating the different customer process systems into a single front-end and providing the employee with a contact history so that the customer queries can be handled better and resolved more efficiently.

Whilst all of these systems have disparate primary functions, they all create detailed and important management information which form part of the overall picture of performance in any organization.

OBJECTS OF THE INVENTION

An object of the disclosure is to provide an organization with a single source for performance measurement information and a configuration tool to allow an organization to manipulate and exploit this data to provide all the users with a consolidated view of their own performance or that of their teams, departments, sites or business units.

This is referred to in this specification as "information management".

A second objective is to provide the end-users (mainly agents, team leaders and managers) with a process for managing performance, the process comprising the following.

Performance Review—to facilitate individual review of one's own performance.

Appraisal management—to provide more consistency and objectivity around the review/appraisal process.

Personal Development Plan—to ensure that all training and development efforts are more closely linked to the business objectives.

Reward Manager—calculation of reward points and the administration of a gift process to promote improved fairness and staff motivation.

The combination of these is referred to in this specification as "performance management".

SUMMARY OF THE INVENTION

According to the invention, there is provided a performance management system for use in an organisation having employees working to achieve organisation performance goals, the system comprising:
configuration function comprising:
an employee setup function comprising means for creating a database record for an employee, and
an objective function comprising means for configuring objectives for employee performance,
an information management function comprising means for capturing raw data, and for processing the captured new data according to an objective to generate employee performance data, and
a database comprising means for storing said performance data and for interfacing with the configuration and the information management functions.

In one embodiment, the configuration functions comprise an objective group function for creating an objective group of objectives to which similar weightings are applied and for associating an employee record with said objective group.

In one embodiment, the configuration functions comprise:
a function for generating an appraisal ratings group of ratings defining how an employee is appraised with reference to objectives,
a data dictionary function comprising means for creating a data dictionary item defining how raw data imported into the system is processed and displayed, and
means in the objective function for associating an objective with an appraisal rating group and with a data dictionary item.

In one embodiment, the objective wizard function comprises means for prompting input of objective description, appraisal definitions, and a rating calculation.

In one embodiment, the configuration function comprise an objective group configuration function comprising means for defining under user instruction an objective group of objectives having the same appraisal definitions and weightings associated with objectives.

In another embodiment, the configuration functions comprises a objective wizard function for configuring objectives for employees and team performance.

In one embodiment, the objective wizard function comprises means for prompting input of objective description, appraisal definitions, and a rating calculation.

In one embodiment, the configuration functions comprises a KPI wizard function comprising means for prompting user input of organisation-level ratings and thresholds.

In one embodiment, the configuration functions comprise a KPI group review configuration function comprising means for grouping KPIs together for reporting purposes, and the information management functions comprise a KPI group review function comprising means for outputting group review data.

In one embodiment, the user interface, the configuration functions, and the performance management functions together have a structure of classes for instantiating objects in a user interface layer, a business logic layer, and a data services layer.

In one embodiment, the business logic class instantiates business logic objects having code of a configuration or an information function, and means for terminating the object at the end of a user session.

In one embodiment, the business logic layer executes on a business server.

In one embodiment, the data services layer comprises a class for instantiating data services objects residing on a database server and means for terminating said objects after a user session.

In one embodiment, the system comprises a transaction server for executing data services layer functions.

In one embodiment, the transaction server comprises means for maintaining a pool of data services objects together and for maintaining a pool of database connections.

In one embodiment, dynamic library links for the objects are registered using proxy stub pairs on both a client and a server.

According to another aspect, the invention provides a performance management system for use in an organisation having employees working to achieve organisation performance goals, the system comprising:
- a configuration function comprising means for generating an appraisal ratings group of ratings defining how an agent is appraised with reference to objectives;
- a configuration data dictionary function comprising means for creating a data dictionary item defining how raw data imported into the system is processed and displayed;
- a configuration objective function comprising means for configuring objectives for employee performance;
- a configuration employee setup function comprising means for creating a database record for an employee;
- a configuration objective group function comprising means for creating an objective group of objectives to which similar weightings are applied, and for associating an employee record with said objective group,
- an information management function comprising means for capturing raw data, and for processing said data according to data dictionary items for said objectives and objective groups to generate performance data for an employee record associated with the objective group; and
- a database comprising means for storing said performance data and for interfacing with the configuration and information management functions.

Detailed Description of the Invention

BRIEF DESCRIPTION OF THE INVENTION

The disclosure will be more clearly understood from the following description of some embodiments thereof, given by way of example only with reference to the accompanying drawings in which.

DESCRIPTION OF THE EMBODIMENTS

Overall Architecture

Figure 1A:
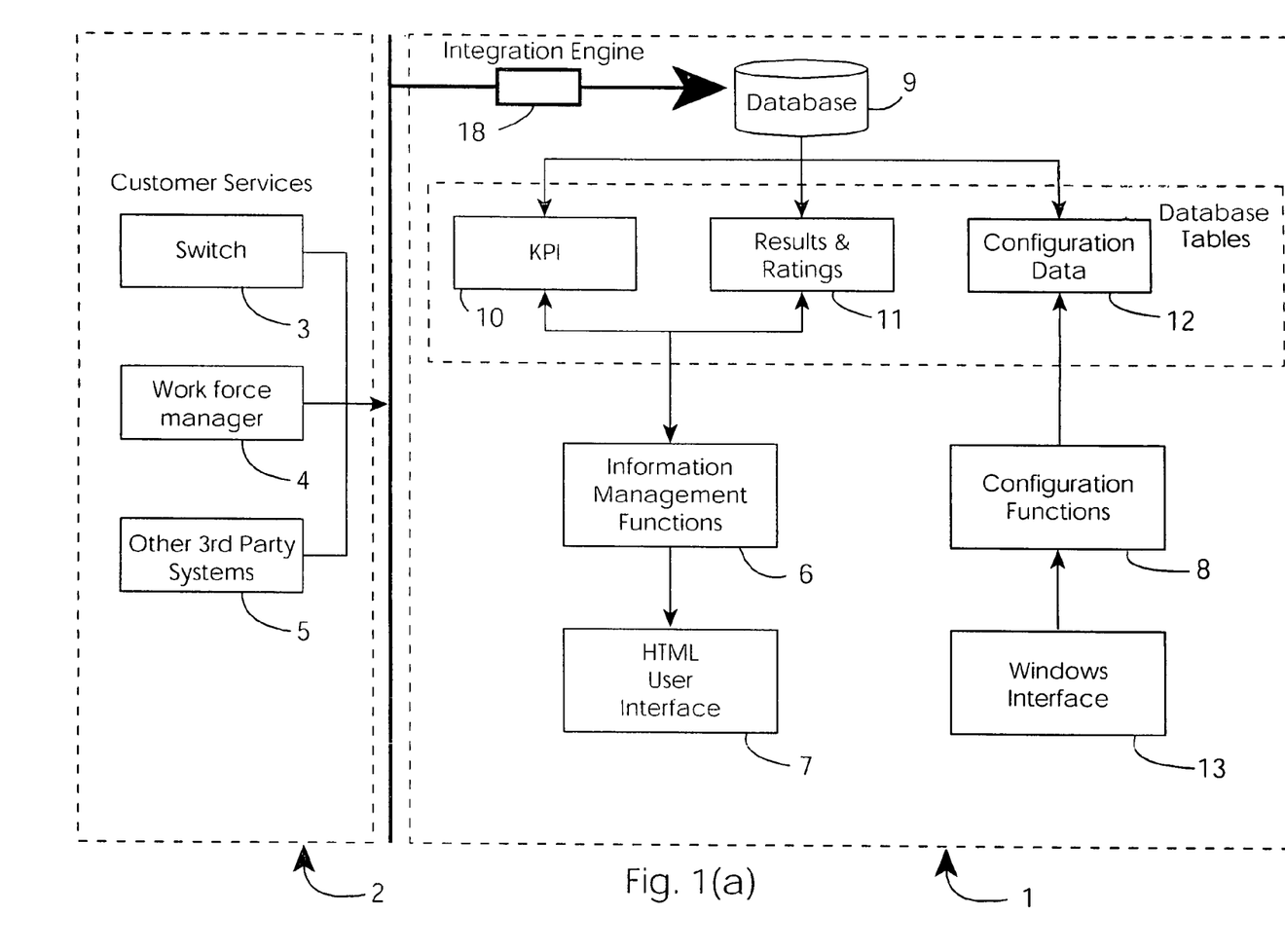
FIG. 1(a) is an overview block diagram of a performance management system of the invention.

Referring to FIG. 1(a). there is shown a performance management system 1 for the management of performance in a customer services environment and reporting on same. The system 1 interfaces with external performance measurement systems 2 comprising a switch 3, a work force manager 4, and third party systems 5 that store performance measurement data within a structured database and can produce reports on either employee, application, departmental or organizational performance. The external systems 2 do not form part of the invention, however the interface with these systems (API's and integration engine) are a part of the invention, as they allow raw data to be formatted and imported into the performance management system.

The system 1 comprises information management functions 6 which use data from a KPI (key performance indicator) table 10 and a results & ratings table 11 within a database 9 to perform calculations pertaining to individual performance of employees, in addition to the overall performance within the customer services center. The information management functions 6 interact with an HTML user interface 7 to display to the end-user the results of the calculations performed on performance. The database 9 also contains configuration data tables 12. The contents of these tables allow the system 1 to be tailored to suit individual organizations, thus minimizing the need for bespoke development of the system to suit particular business operations. The configuration data is captured through the use of configuration functions 8 and a Windows™-based interface 13, which provides the user with a GUI to specify the unique characteristics of the organization.

At a high level, the database 9 captures raw data from the external systems 2 in a structured manner using APIs, however, flat-file reports may alternatively be used. The raw data is processed by an integration engine 18 according to requirements configured in the integration engine. The performance data is provided in real time via the HTML user interface 7 in response to appropriate requests/enquiries. The performance data may relate to individual customer service agents, to teams, or to overall departments and even site locations. Performance is measured against objectives set up during configuration, and also against KPIs. . Like objectives, KPIs have targets but are not rated. However they do not relate to persons, but instead to an organization or department as a whole.

Figure 1B:
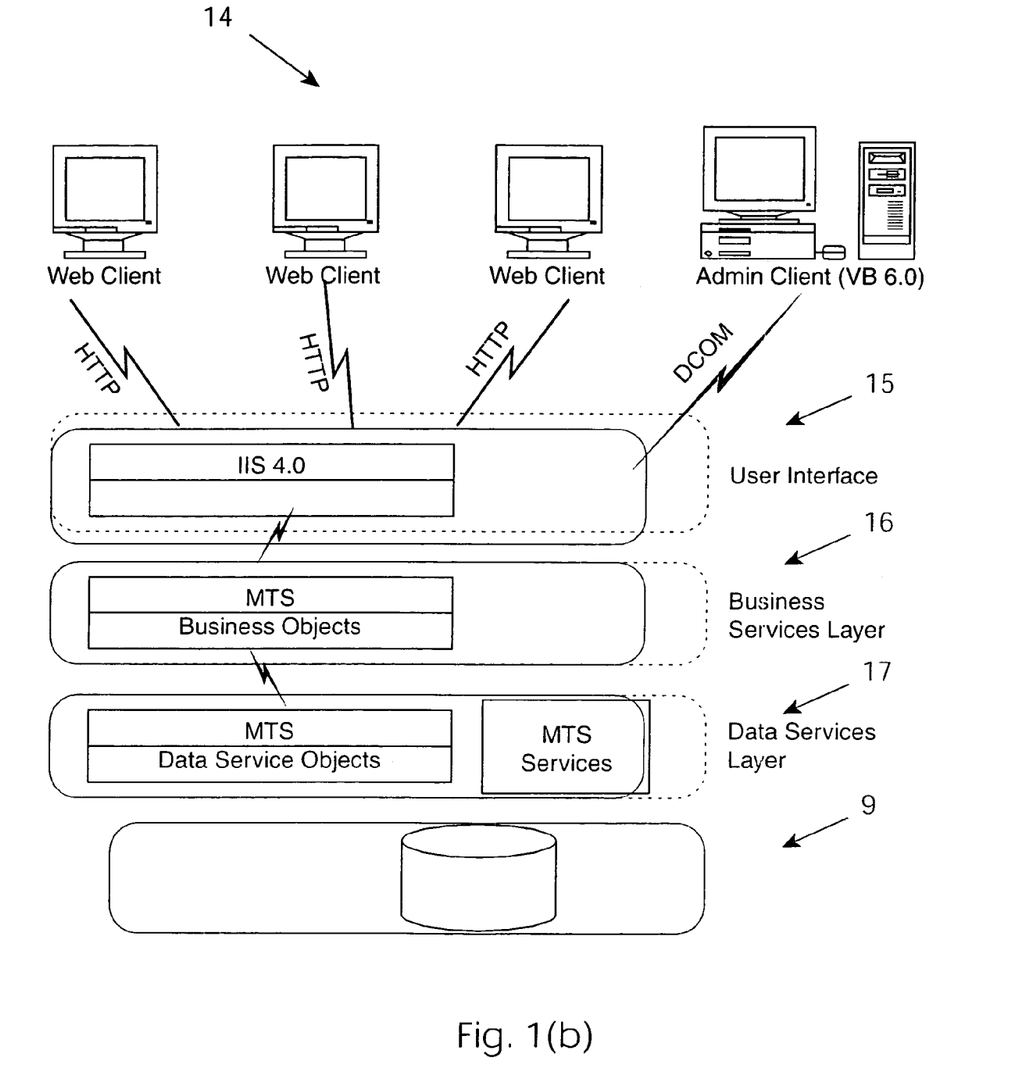
FIG. 1(b) is a diagram illustrating the physical architecture of the performance management system.

The physical architecture of the system 1 is shown in FIG. 1(b). It has a three-tier architecture, which includes a user interface layer 15 supporting the functions 7 and 13, a business services layer 16 supporting the functions 6 and 8, and a data services layer 17 supporting the database 9. The functions are instantiated as objects from user interface, business logic, and a data services classes. Objects are instantiated for a task such as a user enquiry session and are terminated at the end.

User Interface Layer 15

There are two types of user interface as follows.

The Browser Interface 7

This consists of a set of Web classes that reside on a Web server. Objects instantiated from these classes send HTML to a client browser. The primary role of the browser 7 is to view the data in a variety of ways i.e. graphically, tabular, by day, by month, by year. The browser front-end allows the measurement and management of performance. The measurement is by viewing the data in a variety of forms, and the management is by allowing the user to specify (according to his security privileges) targets, development plans, comments and even override results. The Web server interfaces with user Web clients 14.

The Interface 13

This consists of a set of forms which reside in the user interface layer 15. It sends the configuration data directly to the business services layer. The primary role of the interface 13 is to configure the browser 7 and to determine the behaviour of the data within the system 1. The Windows interface allows 'tailoring' of the system to meet the specific requirements and characteristics of the contact management centre, thus omitting the need for expensive customisation of the product.

Business Services Layer 16

This layer comprises a business server on which resides the functions 6 and 8. These functions perform all calculations and all validations. The interface 13 directly accesses the business server whilst the interface 7 accesses the business server via the Web server.

Data Services Layer 17

The data services layer 17 comprises a data server hosting the database 9. This layers performs data integration with the external systems.

A data server hosts data services objects in addition to the actual database 9. The business server calls the data services object, which then in turn retrieve data from the database 9.

The system 1 also comprises a transaction server. This handles all of the database transactions between the objects in the business layer and the objects in the data services layer. It holds a pool of objects together, maintain a pool of database connections, and allows improved scaleability and performance Dynamic Library Links (DLLs) are registered using proxy stub pairs on both the servers and on the client. When a function 6 requires the DLL, the proxy stub pairs direct the function to the DLL stored on the server. The proxy stub pairs therefore enable the objects to communicate with each other across multiple servers.

Functions of System

Figure 2:
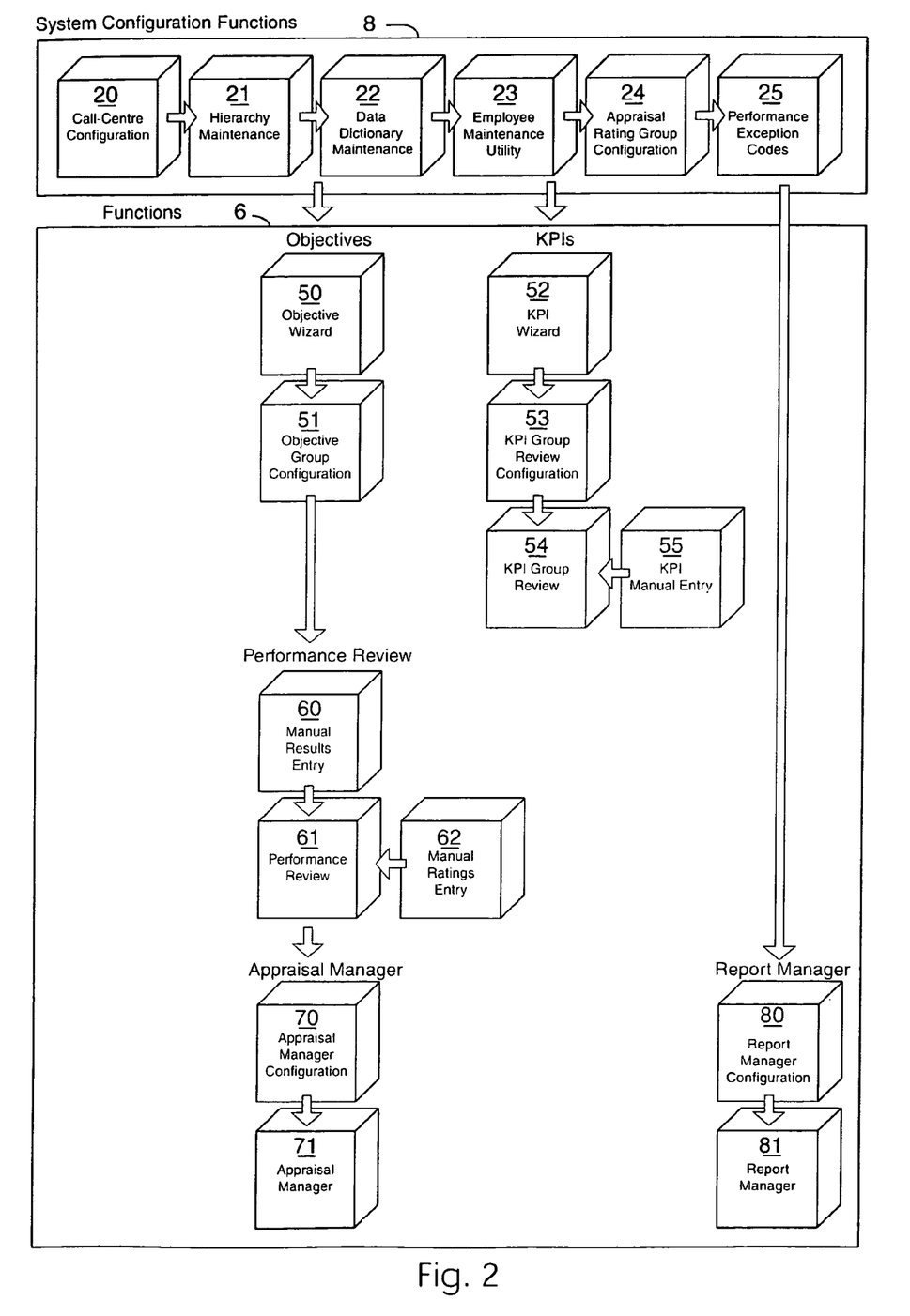
FIG. 2 is a block diagram illustrating the main functions of the performance management system.

Referring now to F*ig*. 2, the configuration functions 8 include:
  20 Call Center Configuration
  21 Hierarchy Maintenance
  22 Data dictionary maintenance
  23 Employee Maintenance Utility
  24 Appraisal rating Group Configuration
  25 Performance Exception Codes
The information management functions 6 include:
  50 Objective Wizard
  51 Objective Group Configuration
  52 KPI wizard
  53 KPI Group Review Configuration
  54 KPI Group Review
  55 KPI Manual Review
  60 Manual Results Entry
  61 Performance Review
  62 Manual Ratings Entry
  80 Report Manager Configuration
  81 Report Manager Overview of Functions The Data Dictionary is a feature that determines how results are generated from imported data and how those results are displayed. The data dictionary is populated by creating individual dictionary entries one at a time. Each entry defines how a performance related result is generated, such as Average Handling Time, Total Calls, Service Level, etc. For each result obtained, the Data Dictionary entry defines:
  Where the data is obtained from (in the database).
  The calculations that are performed on the data to generate the result.
  How often the data is measured.
  Whose performance is represented in the result (e.g. Agents, Team Leaders, and Managers).
  How the data should be displayed in the system (e.g. AHT given in seconds or minutes).
  Whether the result represents a key performance indicator (KPI).
  Whether the result can be manually overwritten.
  The minimum and maximum permissible values for that result.

Regarding appraisal rating groups, each group can have up to ten appraisal ratings that will be used when the employees are appraised and their objectives rated against their results. Appraisal rating groups are required because in some organisations employees may be appraised differently depending on, for example, which department or division they work for. The appraisal rating groups are used throughout the system. The company defines the review periods (monthly, quarterly, half-yearly, yearly) to apply for performance appraisal within the organisation. Up to 10 Ratings can be defined within a group. Each rating will be given a name, description, and an icon (for graphical representation on-screen).

An Objective is a performance expectation that is assigned to an individual (agent). The individual is then measured against the performance criteria, e.g. average handling time. This measurement is compared to the objective's target and rated accordingly. The objective is uniquely associated with an objective class. This enables the system to class or sort objectives for reporting purposes.

The company (supervisor) defines whether the objective is based on the individual's results or based on the results of either the team reporting to them or their peer team. Once this has been defined, the company also defines the measurement field (using data dictionary titles) to identify the data being appraised.

The measurement data for an objective may be captured automatically (from external, third party systems), or manually entered by a company. This data is then used for comparison against predetermined targets for the objective within defined measurement periods.

For team objectives, the result is based on the combined result for all individuals within the team. Once this has been calculated, the team's rating for that objective is derived by referring to the associated appraisal rating group.

The company determines the target period to apply to each objective. The target period can be monthly, quarterly, 6-monthly, or yearly.

An objective is automatically rated for the target period selected by the company. However, the company can also determine additional rating periods for the objective if required. It should be noted that the target set for the target period would apply to the additional rating periods.

The company determines whether the objective is rated according to absolute result values or by percentage improvement (or percentage change) from the target value.

For absolute result ratings, the company defines the threshold value for each rating defined for that Objective, as well as an operator (>, <, =, <=, =>) for it. Individuals are rated depending on which of these ratings their result falls into.

A % Improvement method rates an individual on how much their results deviate from their target. It is measured using the following formula:

(Result−Target)/Target*100

The resulting percentage value is then compared to the thresholds that have been entered and a rating is obtained.

The company is able to define the number of points that will be allocated for each objective upon achieving the specific ratings, as well as the frequency with which reward points are allocated. Thus, individuals are able to receive points for achieving targeted performance levels. Performance is therefore linked with the objectives and their associated targets.

Once an objective has been created the company assigns it to an appraisal rating group. This defines the rating categories to be applied to the results for that Objective.

An objective group is a collection of objectives that have been grouped together for ease of management.

The objectives that can be collected together are defined by:
  The level within the organisational hierarchy for which the objective group is to apply.
  The appraisal rating group selected.

Each objective group is given a name and a description, and also the level of the hierarchy to which the new objective group will apply.

The ratings that apply to the selected appraisal rating group are displayed and the company can enter a score and edit the overall expectation for each rating.

A score is used when calculating an employee's overall rating. An overall rating rates an employee on their overall performance, taking into account their results for all of their objectives.

The concept of overall expectation relates to a process of combining ratings.

There are two situations where ratings are combined:
i. When the ratings that an employee has achieved in each of their objectives are combined to give them an overall rating.
ii. When the ratings that an employee has achieved in each target period are combined to given them a rating for an additional rating period.

In either of these cases, the overall expectation is used to reduce the final score required to achieve a certain rating.

The company will be able to select which objectives to place within each group and specify a weighting percentage to apply. Weighting is a means of prioritising objectives, so that high priority objectives carry more weight than low priority objectives. This prevents the system from giving an unrepresentative rating for an employee's performance. The total of all the weightings must add up to 100

Each employee that will have objectives assigned to them must first be configured, or setup, into the system. The system creates and maintains a unique record for each employee holding basic employment information. This includes: employee name, system name, password, their level within the organisational hierarchy, who they report to, the associated appraisal group, the associated objective group, the associated report group, the associated KPI group, and the name of their team. It can also hold additional, optional information: Address details, their ID's on the various third party systems that the system 1 interfaces to, and other related information (mobile phone numbers, etc).

Each employee is uniquely identified with the system using employee ID number. This number is used to enables the system 1 to setup links to other third part systems.

An employee is associated with at most one organisational level with the hierarchy, such as team leader.

An employee record will identify the individual, at the level above within the hierarchy, to whom he or she will report. This also identifies the team name. It also determines which appraisal rating groups, objective groups, retort groups, and KPI groups can be associated with the employee.

The first person assigned to a team will dictate the Appraisal Rating Group for the team. Thereafter, all other team members must have the same appraisal rating group, regardless of the objective group.

Reporting Groups allows the user to create a group which can then have reports associated with it. Once the reports are associated with the group then the group is associated with an employee, hence allowing employees to view specific reports according to their requirements. A KPI Group may be associated with the employee so that the employee can have access to the KPI data held within the KPI group. Only one KPI Group can be assigned per employee.

Detailed Description of Functions

Call Centre Configuration Function 20

Figure 3A:
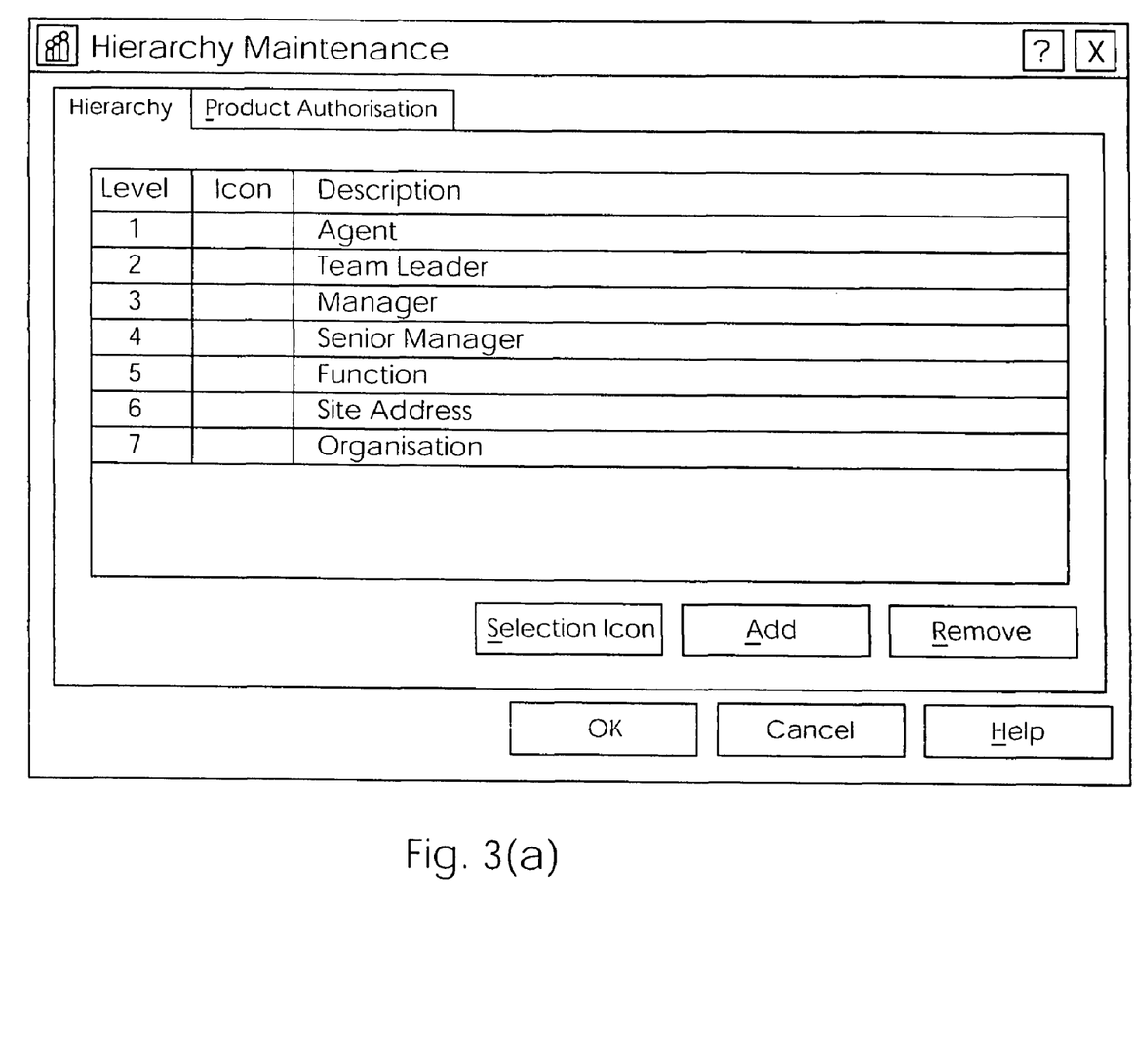
FIGS. 3 to 4 are sample screen shots illustrating aspects of the performance management system.
Figure 3B:
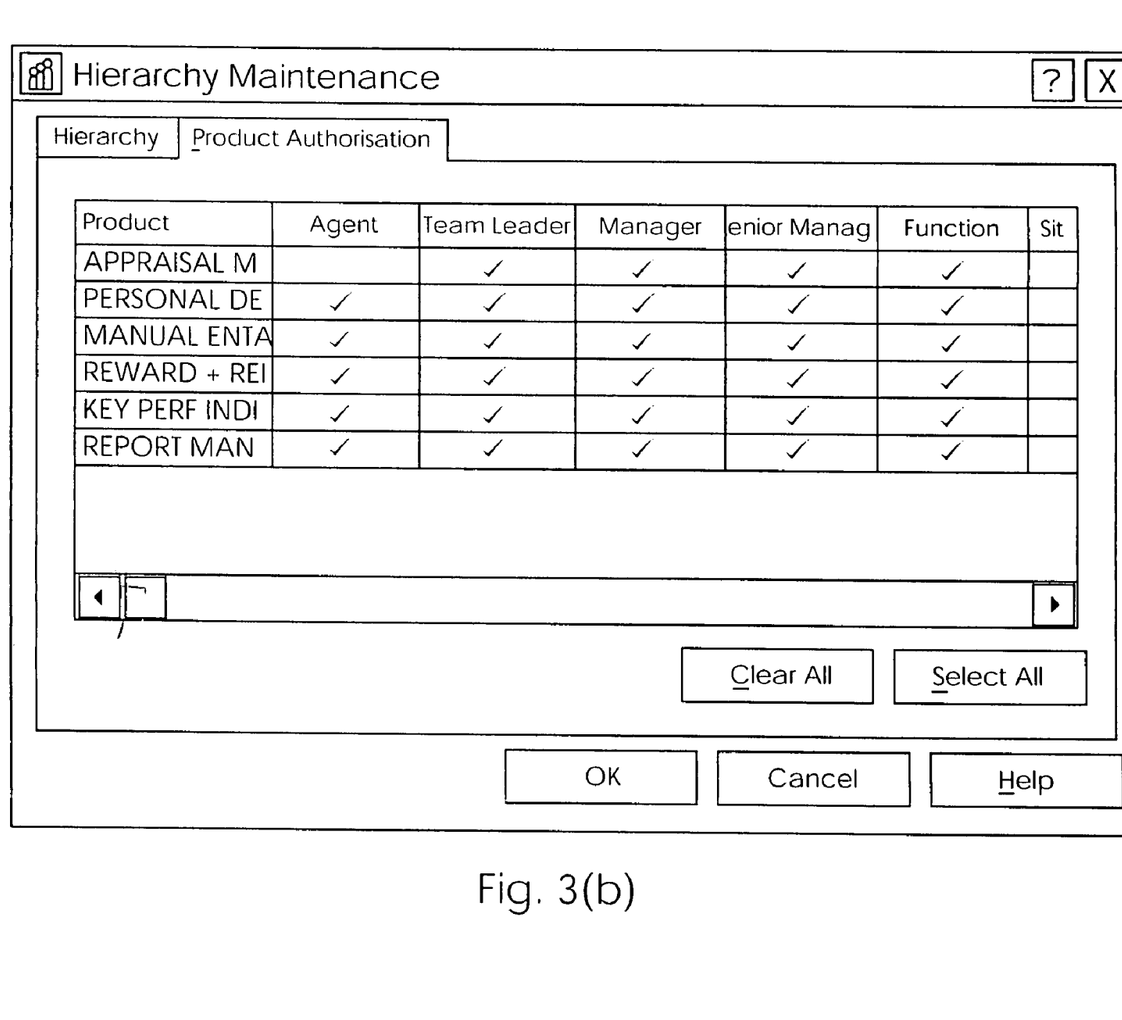

The call centre configuration function 20 is used via the Windows™ interface to construct the conceptual organisational hierarchy. The organisation can configure up to ten hierarchical levels. FIG. 3(a) shows an example for an organisation that has seven levels from agent through to the global organisation view. The screen of FIG. 3(b) then allows the user to determine functional access (at the browser end) to the various performance management functions for each level as specified in the system hierarchy in FIG. 3(a). This is inputted in a simple Yes/No cellular structure. Because the defined organisational hierarchy forms a basis for the operation of many other functions, amendments to the same can only be made by a senior systems administrator with the appropriate access and user rights.

The function 20 is coded in Visual Basic™ and refers to the characteristics of the customer services centre.

Hierarchy Maintenance Function 21

After the call centre configuration has been defined a hierarchy configuration is then set up for each site using the function 21. The fields completed for site configuration are call centre name, call centre ID, year and week start values, system days, close off data, currency mask and a moratorium value.

Data Dictionary Maintenance Function 22

Figure 4A:
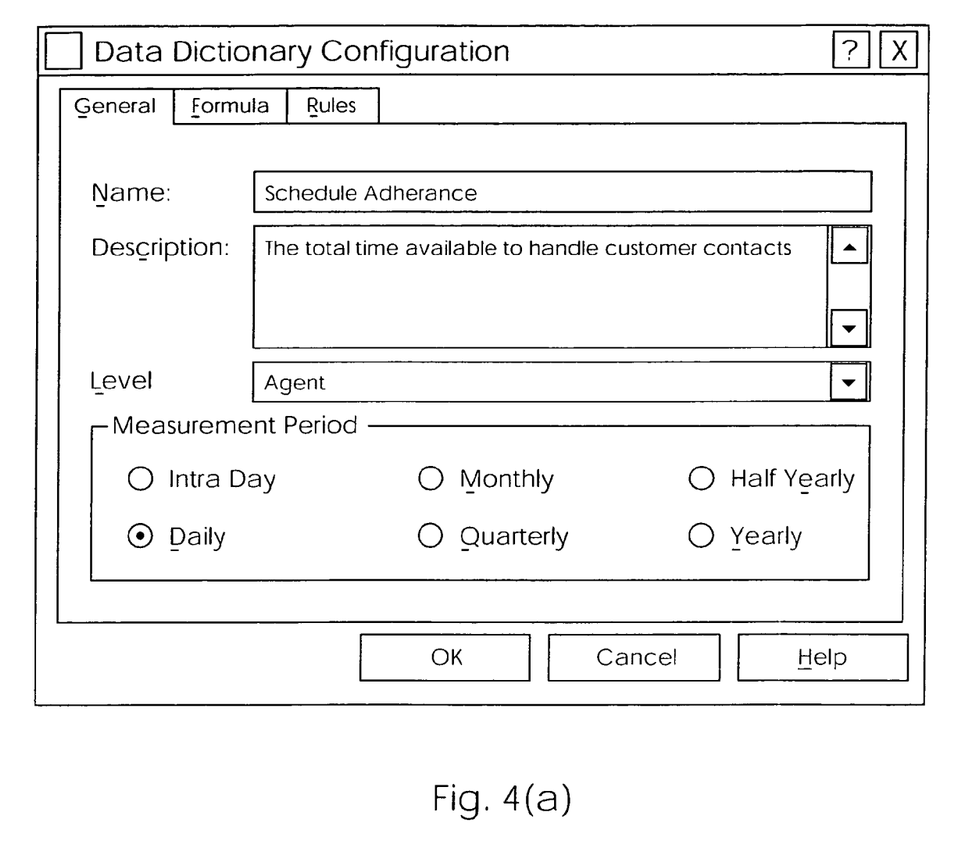
Figure 4B:
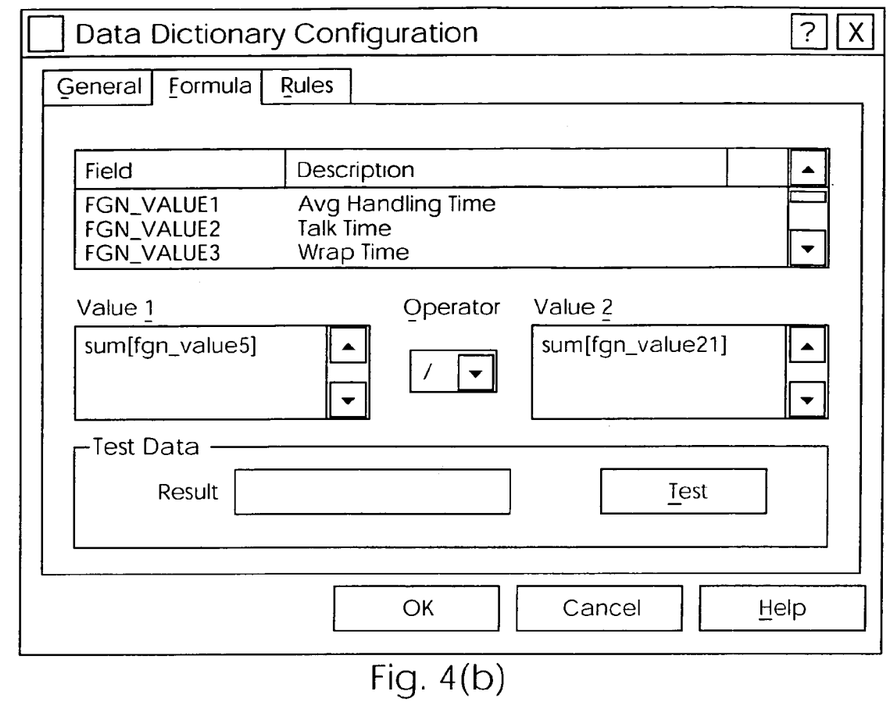

The data dictionary maintenance function 22 allows users to manipulate the measurement data that has been imported from the third party performance measurement systems. The primary purpose is to formulate the performance management system objective fields from all the data fields imported from the external third party databases or performance measurement systems. A sample screen is shown in FIG. 4(a), in which the user is creating a new data dictionary field that forms the measurement of schedule adherence (the percentage of time an agent actually spends signed-on to their phone against the time they were scheduled to be there). As illustrated, the user inputs a name description, associates the data dictionary field to a level in the hierarchy, and specifies the period against which the measurement data is captured. The level must be chosen from the set established when creating the organisation hierarchy. A second screen, shown in FIG. 4(b), is used to assign the data dictionary name to a database held or a combination of database fields and defining how these fields are to be calculated. The calculation is defined by a Value 1/Operator/Value 2 sequence. In the example FIG. 4(b), the user selects the field [fgn_value5] which relates to the actual time the agent was signed-in (taken from the ACD) and divides this by [fgn_value21] which relates to the amount of time they had been scheduled to be signed-in (taken from the workforce management system 4).

The following table sets out the field descriptions in more detail.

| Field Name | Mandatory/ Optional | Field Behavior | Field Description |
|---|---|---|---|
| Field | — | Displayed | This column displays the database fields that may be entered. |
| Description | — | Displayed | This column displays the description associated with the field. This cannot be edited by the user within the DDM 22 as it is display only. It is stored within the DDM. |
| Value1 | M | Input | This fields allows the user to enter the summation formula for the summary periods. A result will be produced for all periods regardless of whether the period was chosen as a rating period in the objective wizard function. Supported<br><br>All approved ANSI 92 SQL Statements.<br>The result of this part of the formula will be stored in the database and used to sum results for period and teams. |
| Operator | O Mandatory if Value2 is entered | Selection | This operator makes up the complete formula using Value1 and Value2. Initially the data from the foreign data table is calculated using the full formula. To calculate the sum for periods and teams, the formula Value1 Operator Value2 will be used. Available operators<br><br>+; −; /; * |
| Value2 | O | Input | This fields allows the user enter the second part of the Summation Formula. This field may not be required for similar formulae of a field assignment. Supported<br><br>All approved ANSI 92 SQL Statements<br>The result of this part of the formula will be stored in the database and used to sum results for period and teams |
| Result | — | Display | Displays the result of an expression based on skeleton data, when the 'TEST' option is selected. |

The following table sets out the command options.

| Command Name | Description |
|---|---|
| TEST | This allows the user to test the full formula entered. A result of the Formula is displayed from skeleton test data in the database. |
| OK | Saves any changes/additions made by the user without prompting for confirmation of same; and quits component/application. |
| CANCEL | If change/additions made, prompts user to save same; otherwise quits component/application. |
| HELP | Opens Help file for component. |

Figure 4C:
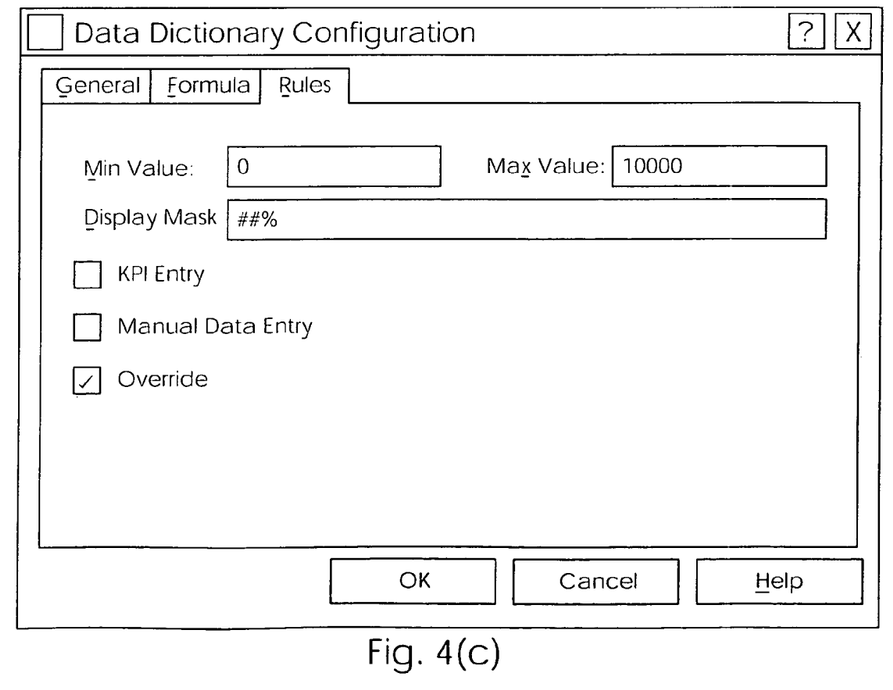

FIG. 4(c) shows the input screen used to define the data dictionary rules. These rules define how the result for the field is entered, displayed, and calculated. As illustrated in FIG. 4(c) the minimum and maximum values are set, as is the display mask. In this case ## % means that the result will be displayed as a % and rounded up with no decimal places. The over-ride check box allows the organisation to control whether or not these results can be over-ridden by a user's manager. The following table describes the inputs in more detail.

| Field Name | Mandatory/ Optional | Field Behavior | Field Description |
|---|---|---|---|
| Min Value | O | Input. | This field is used to restrict the input permitted for a manual data entry or a result override. The value entered must be greater than or equal to this value. |
| Max Value | O | Input. | This field is used to restrict the input permitted for a manual data entry or a result override. The value entered must be less than or equal to this value. |
| Display Mask | O | Input | Determines how the result for the data dictionary field will be displayed. Used to indicate currency, percentage, minutes or seconds. |
| KPI | O | Check | Indicates that this data dictionary field will be used in conjunction with KPI's and not objectives. |
| Manual | O | Check | Indicates that this data dictionary field will require a manager to enter a result manually and that data will not be populated automatically from the switch. |
| Override | O | Check | Indicates that results for this data dictionary field cannot be over-ridden in the team performance review screen. This field will be used where the formula for the data dictionary is deemed too complicated to allow values to be changed. |

The following are the command options

| Command Name | Description |
|---|---|
| OK | Saves any changes/additions made by the user without prompting for confirmation of same; and quits component/application. |

-continued

| Command Name | Description |
| --- | --- |
| CANCEL | If change/additions made, prompts user to save same; otherwise quits component/application. |
| HELP | Opens Help file for component, if in WinHelp then the topic is generally (but not always) specific to the tab/component the user is currently using. |

The following are the business rules.

| | |
| --- | --- |
| Description | If the data dictionary created is to be used to provide data for the key performance indicators (KPI's), then it must be entered above the highest level specified. |
| Reason | Entering the data dictionary that is to be used in conjunction with a KPI at the highest level. |
| Typical Scenario | A data dictionary is to be created for Average Handling Time. This will also be later used as a Key Performance Indicator. The level for the AHT is the level higher than the highest level specified in Hierarchy Maintenance, i.e.: if the highest level in Hierarchy Maintenance was 'Organization' at Level 7, then the Data Dictionary for AHT is specified at Level 8. |

The following are the best practices.

| | |
| --- | --- |
| Description | The display mask must be configured to reflect the maximum characters as specified in the 'Max Value' field, i.e. if the maximum value is 4 characters (1000) then the display mask must provide provision for 4 characters (###0). |
| Reason | The input mask must provide provision for all the characters entered into the data dictionary field. |
| Typical Scenario | A manual entry data dictionary is set-up called 'revenue', which will have a maximum amount of £1,000,000. The call center wish this to be displayed with commas separating every 3 characters, a '£' sign and to 2 decimal places, therefore the input mask is specified as '£#,###,##0.00 |

Employee Maintenance Utility 23

The employee maintenance utility 23 creates an employee (agent). The inputs include name, password, password confirm, organisation hierarchy level, a manager to whom the employee reports, an ID, an objective group of which the employee is a member, a team name, a flag indicating whether KPI data will be attributed to the employee, addresses, system ID, and any additional information. The following business rules are applied to employee creation, objective creation, and objective modification.

Employee Creation

| | |
| --- | --- |
| Description | Before assigning an employee, a manager, team name or objective group, the employee must be assigned a level. |
| Reason | The level determines the possible managers, teams and objectives that the employee could be assigned. |
| Typical Scenario | An employee is assigned to manager 'X', belongs to team 'Y' and has objective group 'Z'. Before any of these are specified the employee must be assigned a level such as 'Agent'. |

Objective Creation

| | |
| --- | --- |
| Description | All employees that share the same manager must be of the same level and the same appraisal group. |
| Reason | The system 1 only allows provision for a manager to manage employees of a single level. Employees must share the same appraisal group as the performance review assumes only one appraisal group throughout the team. |
| Typical Scenario | As employees are entered onto the system 1 and assigned managers, only those at the same level and who share the same appraisal group will be allowed to be entered into the same team. |

Objective Modification

| | |
| --- | --- |
| Description | An employee's objective group can be amended after it has been specified. In the event of an employee's objective group is amended more than once in a single day, all intermediate objective groups will be deleted and all results and ratings will be attributed to the final objective group. |
| Reason | Each objective is specified to an employee. When a new objective is assigned, the current date is attributed to the start date of the new objective. The previous objectives end date is set as the previous days date. |
| Typical Scenario | The firm intends to move an employee from objective group 'A' to objective group 'B', however it accidentally moves the employee to objective group 'C'. The mistake is later rectified on the same working day, and any results and ratings that were collected and attributed for objective group 'C' will be reallocated to objective group 'B'. |

Appraisal Rating Group Configuration Function 24

The appraisal rating group configuration function 24 allows the user to define appraisal rating groups. Each group can have up to ten appraisal ratings, which will be used when to rate individual employee's objectives.

The review periods available for the system are also defined within this utility. These review periods dictate the 'period selection tabs' displayed in functions such as personal performance review and appraisal manager, as well as dictate the periods (apart from daily and weekly) when ratings can occur as set out in the objective wizard function.

The user creates the appraisal rating groups and these will be used throughout the system. These appraisal ratings form an integral part of the system. Separate appraisal rating groups would be set up where a different function in the organisation might wish to rate individuals in a different fashion.

The input screen defines an appraisal rating group and the appraisal review periods that apply to it. This screen allows the user to configure appraisal rating groups which are used in conjunction with objective wizard, objective group configuration—objective group rating, appraisal manager, personal performance review. The user configures appraisal rating groups, which appear on all the above screens. There is a maximum of ten Appraisal Ratings per group and more than one appraisal rating group can be created. The users must ensure that they select all the review periods required for all objectives i.e.: they might only have a requirement to review sickness and absence at the 6-month juncture. However, they must select 6 month and it will apply to all. The review period is by appraisal group and not by objective.

Performance Exception Codes Configuration Functions 25

The performance exception codes configuration function 25 allows the user to configure standard codes which can be used by an individual's manager to over-ride their performance for given reasons like system issues, health etc. This functionality ensures that the system 1 allows discretionary management decisions within the organisation but has a means of tracking and reporting on these.

The basic principle behind this is that the agents (and team leaders) take responsibility for their own performance and enter comments against their performance (good or bad) in personal performance review. The manager then has the ability to exclude/override the result for that day from their overall result and from any averages. They must however enter a code for the exception; this will be reported to management and will highlight the various reasons for excluding bad results. This screen is the configuration screen to set up the standard reason codes and is mainly used during the initial system installation. Ongoing changes or additions may be needed as the conditions change.

Objective Wizard Function 50

An objective wizard function 50 defines an objective. An objective is a performance expectation assigned to an individual and is set up using the objective wizard 50. The wizard function 50 prompts input of the following values.

| Field Name | Mand./ Opt. | Field Behavior | Field Description |
|---|---|---|---|
| Objective Name | M | Input | Name of new objective e.g. average handling time. |
| Description | M | Input | Free-format textual narrative explains the overall purpose of the objective. |
| Appraisal Rating Group | M | Input—Pre-defined List | This field allows a user to assign an appraisal rating group to an objective, thereby allowing the user to review and appraise many objectives together. |
| Objective Class | O | Input—Pre-defined List | This field allows the user to associate an objective class with an objective. It allows the user to class/sort objectives for reporting purposes only. |

A next step prompts input of data indicating the source of data for the objective. The following are the inputs.

| Field Name | Field Behavior | Field Description |
|---|---|---|
| Rating—Calculated | Option | The rating will be calculated by an overnight process based on results and rating methods. |
| Rating—Manual | Option | The rating be will manually entered by a team leader or manager for each target period (as specified on the next screen). This rating will be added together for periods greater than the target period. When this entry is selected, no data dictionary field needs to be selected as we are giving a rating for the objective and no data or results are required to compute the rating. The data dictionary and result type section will be disabled. The rating will always by applied to individuals. The additional rating periods category in a next screen will be disabled. The target period will define the period for which manual rating is entered. After the target period is selected in the following screen, the final screen, "Finished", will be presented in the objective wizard function. |

-continued

| Field Name | Field Behavior | Field Description |
|---|---|---|
| DDField—Standard | Option | The measurement data is automatically captured—from the ACD Switch for example. The drop down will list only non-KPI, non-manual data dictionary items. |
| Manual Result Entry | Option | The user will have to key in the result, which will be used in the objective. The drop-down will list only non-KPI, manual data dictionary items. |
| DD Field—Drop Down | Selection | Lists All data dictionary fields that are not set up for KPI and are manual only if the Manual Option is selected. The data dictionary field defines the Measurement Period for the objective. One cannot select a target or rating period lower than this measurement period. |
| Result based upon Individual | Option | The objective will use an individual result when calculating the rating. Objectives of this type may only be assigned to employees at the same level as the data dictionary field associated with the objective, or a higher level. |
| Result based upon Reportee Team | Option | This is, in effect, the same as Individual results. Individual and reportee team are treated the same by the system. Starting at the level associated with the data dictionary field, results are always summed up into teams. The team result for Level 1 becomes the individual result for Level 2 and so on. This field makes it clearer to the user what type of objective is being set up. |
| Result based upon Peer Team | Option | The objective will use the team result when calculating the rating. Objectives of this type may only be assigned to employees at the same level as the data dictionary field associated with the objective, or, employees at a level higher than the data dictionary level. The objective is always, in-effect a peer objective, i.e. the employee will be rated on the result of the team that he is part of. The result and rating that he will see will be stored on the database with his manager. When these objectives are assigned to team members, pseudo objectives are assigned to the team leader. No calculation of ratings is performed for the team members, but rather they see the result and rating for the team that is assigned with the team leader. If team peer result is selected, the objective will only be rating using absolute values; i.e. the rating method screen will not be shown and absolute only will be assumed. |

The function 50 then proceeds to prompt input of rating periods, rating methods, absolute thresholds, and to improvement thresholds. For example, the rating method maybe based on either an absolute result or a percentage improvement on the initial target set.

Objective Group Configuration Function 51

The objective group configuration function 51 allows users to create and administer objective groups for the purposes of easy handling of objectives. The only constraint for groups is that the objectives have the same appraisal definitions. The objective group is defined by:

name, selected appraisal rating group, description, and objectives within the group.

The function 51 also allows a percentage weighting to be applied to each objective within the group. Also, random sample ratings may be applied to each objective.

Linking of Objectives to Agents

Figure 5:
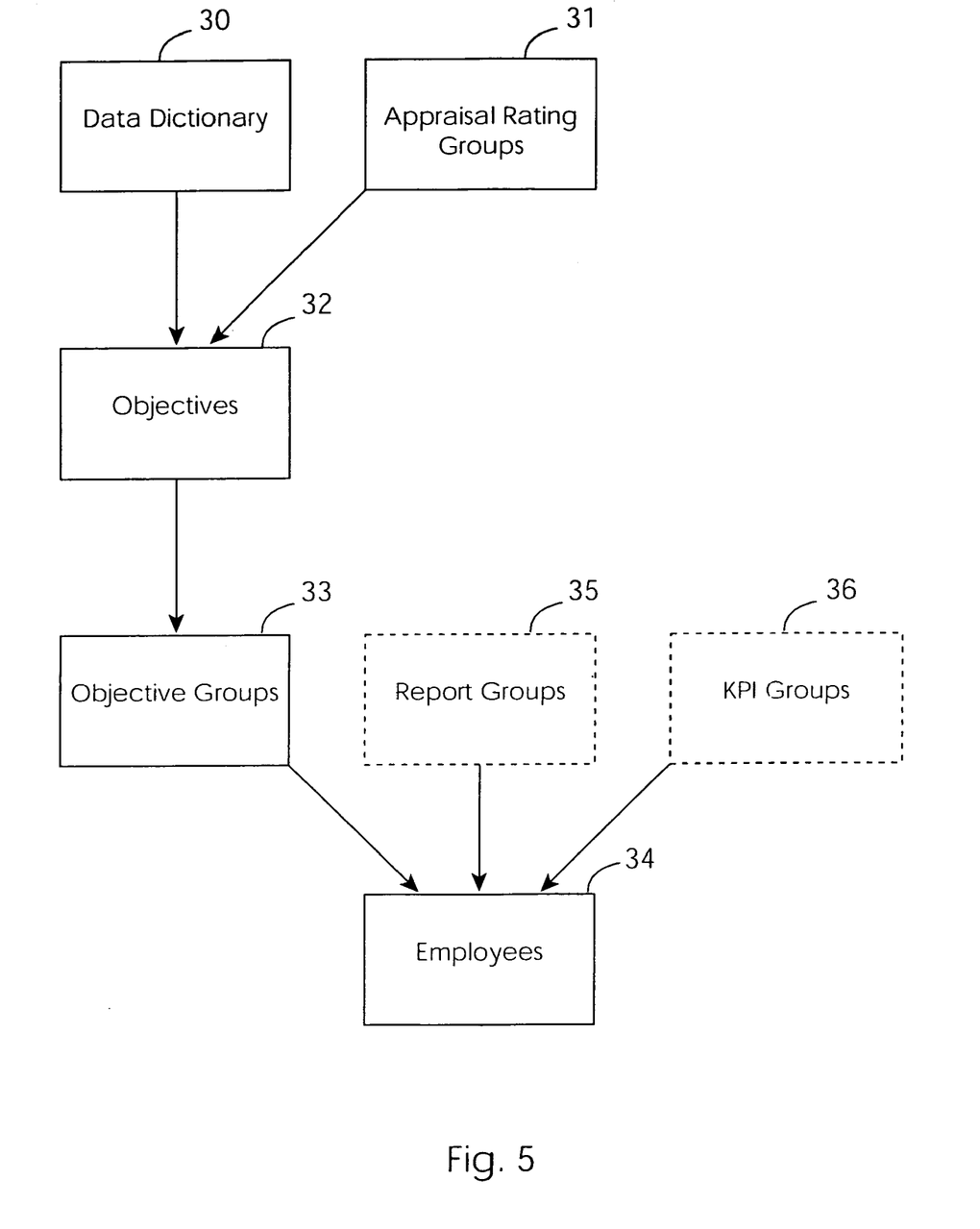
FIG. 5 is a flow diagram illustrating linking of objectives with agents.

As stated above, the information management functions 6 link agents (individuals) to objectives. This is very important as it allows individual agents to "take ownership" of their own performance, aligned to the overall business goals of the organisation, thereby contributing to the overall business success. This is achieved by linking items together as shown in FIG. 5. The chain is as follows:

creating a data dictionary field in step 30,
creating an appraisal rating group in step 31,
linking the data dictionary filed and the appraisal rating group with an objective in step 32,
in step 33 associating the objective with an objective group, and
in step 34, associating the objective group with an agent.

Also, as shown by the interrupted lines the report groups and KPI groups are also associated with the agent in steps 35 and 36. The following summarises the meaning and significance of these items which are linked together.

KPI Functions 52-55

The KPI configuration functions 52, 53, and 54 allow users to define all the key performance indicators associated with the call centre or a subset of the call centre such as customer services. The KPIs are similar to objectives except that they are not assigned to individuals and are not rated. They are merely used to report status. Typical KPIs are Service Level, Abandon Rate, Number of Calls, Total Revenue etc. If the system 2 has been configured to have more than one Skill Group e.g.: Customer Services and Telesales, then there is a group of KPIs for each of these i.e.: Customer Service Level, Telesales Service Level. The KPI data can often be more frequent than employee objective data, which has a minimum measurement period of one day. The system 2 typically produces service level and other information associated with skill groups (also called applications or queues) every half-hour. This means that the system receives half-hourly KPI data from the customer services system 2.

The KPI's are not rated but they have a target for reference purposes. For example, a call centre might state that the abandon rate target is 5% or less. This can then be shown on a graph or report alongside the actual data to show how the call centre is performing.

The KPI wizard 52 prompts definition of:
KPI name and description,
a static target for each month,
additional targets, and
rules.

In a typical scenario, a manager wishes to see the Abandon rate for the call centre on an intra daily basis. A KPI will be set-up to capture this data, and the results will be reviewed via the KPI group review utility and these results are presented in tabular or graphical format. For an effective call centre the manager requires that the Abandon rate is no more than 5%. Therefore, he would enter 5% in the target. As the manager would like to view this on an intra-day basis, the intra-day, daily and weekly check boxes would need to be ticked.

Regarding targets, in a typical scenario a manager wishes to see the days taken absent due to sickness for the call centre on a yearly basis. A KPI will be set-up to capture this data, and the results will be reviewed via the KPI Group Review utility and these results are presented in tabular or graphical format. If the manager wishes to specify the target for the number of days taken absent due to sickness as 40 in a year, the manager would then need to specify in the yearly column the target of 40. If the manager wanted to view the achievement of the target on a quarterly or half yearly basis, then the values of 10 would be needed to be entered for each quarter and the value of 20 for each half year. This also allows the manager to weight the absences (i.e. allow more absences in the winter months than the summer months).

Regarding the rules, in a typical scenario a manger wishes to specify the target for the abandon rate as no more than 5%, therefore, the manger would need to set-up a KPI for abandon rate and specify the target as 5%. The manager would then need to check the "<=" box, thus informing the system 1 that any value below the 5% target would be considered as meeting the target. The manager would then need to specify how the next years targets for the KPI would be calculated.

The KPI group review configuration function 53 allows a user to group a number of KPIs together for reporting purposes. The KPI group review function 54 allows viewing of KPI data as set up by the wizard 52. The functions 52, 53, and 54 all operate with the KPI table 14, which is dedicated to KPI data only.

The team leaders and managers may also use this to reward people where there is no set objective against the action, (i.e. a customer phones in stating that they were pleased with the service they received from an agent).

It will be appreciated that the invention provides for effective centralised performance measurement and reporting, while also greatly assisting with people management in a flexible manner. The system also provides for automated appraisal and reward administration. The ability of agents to view their own development data is very significant as it enhances team participation. The linking of objectives to agents is particularly important at achieving the overall business goals of an organisation.

The invention is not limited to the embodiments described but may be varied in construction and detail within the scope of the claims.

What is claimed is:

1. A computer-implemented performance management method operable in an enterprise comprising individuals organized according to a hierarchy, the method comprising:
    providing a user interface by which a user defines a data dictionary, the data dictionary defining processing of performance management data, wherein the data dictionary comprises one or more data fields, an operator for defining an operation to be applied to performance management data in at least one of the data fields, and wherein each data dictionary field comprises a user-selectable level of the hierarchy to which the data dictionary field is to be applied;
    at a performance management transaction server:
    receiving performance management data;
    applying the received performance management data against the data dictionary; and
    creating for an employee an individual performance measurement according to the operation at the user-selectable level of the hierarchy.

2. The method of claim 1 wherein the performance management data includes data aggregated from a first level of the hierarchy to a second level of the hierarchy to generate an aggregate value.

3. The method of claim 2 wherein the first level of the hierarchy is associated with a set of employees and the second level of the hierarchy is associated with a manager of the set of agents.

4. The method of claim 3 wherein each of the set of employees has an associated objective having a value, wherein values of the associated objective for each of the set of employees are aggregated and associated with the manager.

5. The method of claim 2 wherein each of the set of employees is rated on a team objective.

6. The method of claim 1 wherein the performance management data is received from one or more systems.

7. The method of claim 1 comprising generating a report based on a result of applying the received performance data against the data dictionary.

8. The method of claim 1 wherein the operation associates data from a first data field with data from a second data field.

9. The method of claim 1 wherein the dictionary entry comprises a rule that defines a value associated with performance management data in at least one of the data fields.

10. The performance management method of claim 1 wherein the rule enables a first user in the hierarchy to override a configuration setting of a second user in the hierarchy.

11. The performance management method of claim 10 wherein the configuration setting is overridden by a manager.

12. The performance management method of claim 1 wherein the data dictionary further includes a user-selectable measurement period against which the operation is to be applied.

13. The performance management method of claim 1 wherein the user interface is provided by a web page.

14. The performance management method of claim 1 wherein the hierarchy comprises a first level, and a second level.

15. A computer-implemented performance management apparatus operable in an enterprise comprising individuals organized according to a hierarchy, the apparatus comprising:

a user interface allowing a user to define a data dictionary, the data dictionary defining processing of performance management data, wherein the data dictionary comprises one or more data fields, an operator for defining an operation to be applied to performance management data in at least one of the data fields, and wherein each data dictionary field comprises a user-selectable level of the hierarchy to which the data dictionary field is to be applied;

an information management function executed on a performance management transaction server to receive performance management data, to apply the received performance management data against the data dictionary, and to create for an employee an individual performance measurement according to the operation at the user-selectable level of the hierarchy.

16. The apparatus of claim 15 wherein the performance management data includes data aggregated from a first level of the hierarchy to a second level of the hierarchy to generate an aggregate value.

17. The apparatus of claim 15 wherein each of the set of employees is rated on a team objective.

18. The apparatus of claim 15 wherein the performance management data is received from one or more systems.

19. The apparatus of claim 15 wherein the information management function is to generate a report based on a result of applying the received performance data against the data dictionary.

20. The apparatus of claim 15 wherein the hierarchy comprises a first level and a second level.

* * * * *